United States Patent [19]

Virani

[11] Patent Number: 4,817,983

[45] Date of Patent: Apr. 4, 1989

[54] APPARATUS AND METHOD FOR REPAIRING A MACPHERSON STRUT ASSEMBLY

[75] Inventor: Noorali Virani, Carol Stream, Ill.

[73] Assignee: Maremont Corporation, Carol Stream, Ill.

[21] Appl. No.: 119,860

[22] Filed: Nov. 12, 1987

[51] Int. Cl.$^4$ ............................................. B60G 11/52
[52] U.S. Cl. ................................... 280/668; 267/64.24
[58] Field of Search ....................... 280/668; 267/64.24

[56] References Cited

U.S. PATENT DOCUMENTS 3,954,257  5/1976  Keijzer et al. ....................... 280/668
4,260,176  4/1981  Pacis et al. ........................... 280/668

FOREIGN PATENT DOCUMENTS 63143  5/1981  Japan .................................... 280/668

Primary Examiner—Kenneth R. Rice
Attorney, Agent, or Firm—McAndrews, Held & Malloy, Ltd.

[57] ABSTRACT

An annular resilient member remedies a noise and vibration problem experienced with certain MacPherson strut assemblies after these assemblies have been in normal use for about a year. These strut assemblies include: a first member adapted to be attached to a vehicle body; a second member spaced from the first member and mounted adjacent to a shoulder on the piston rod of the strut assembly; a rubber member disposed between and secured to the first and second members; and an inverted, bell shaped retainer member that is mounted on the piston rod and that extends through the central opening of the first member so that the side of the retainer member engages the first member. The annular resilient member is disposed on the piston rod between the piston rod shoulder and the second member.

9 Claims, 1 Drawing Sheet

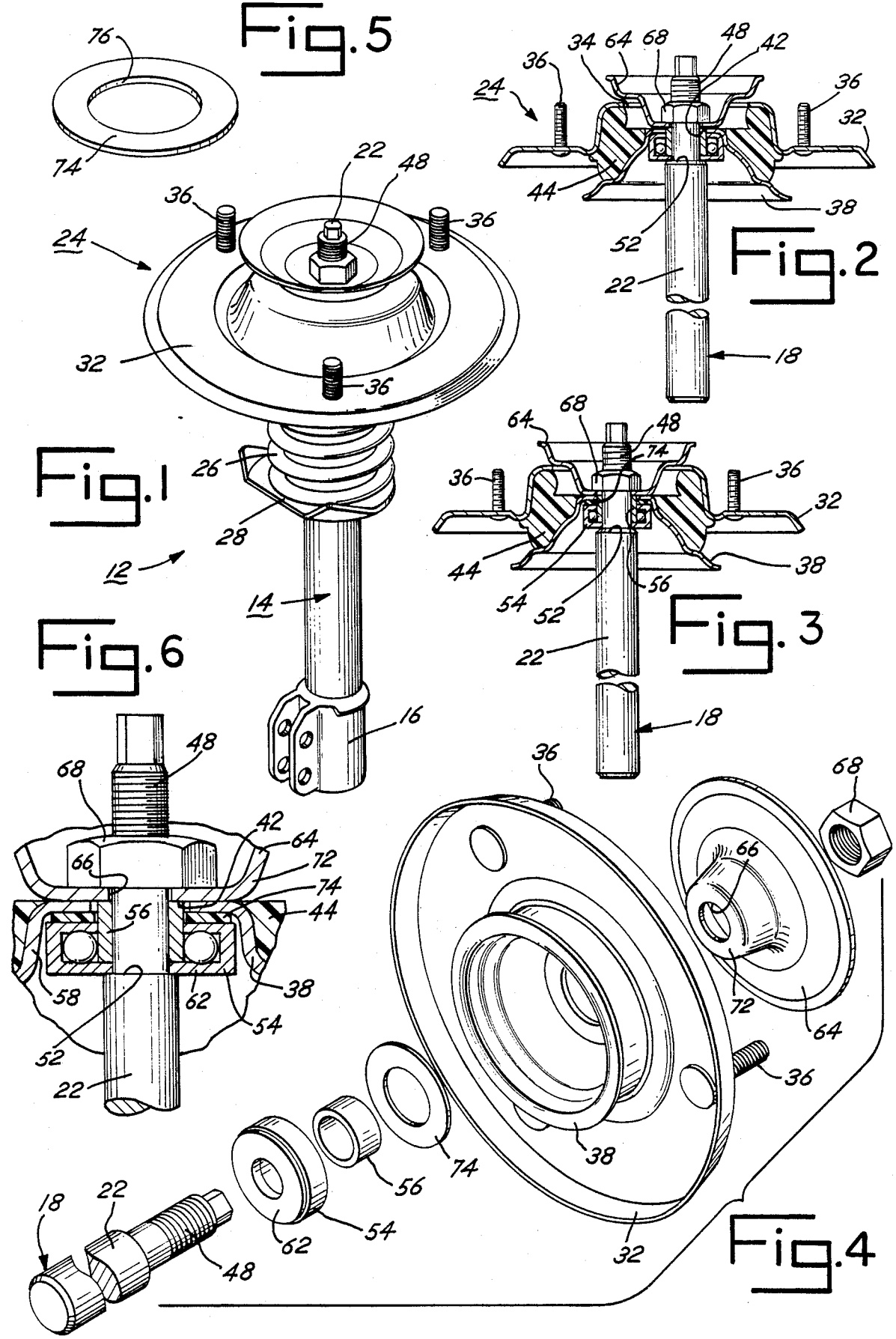

APPARATUS AND METHOD FOR REPAIRING A MACPHERSON STRUT ASSEMBLY

BACKGROUND OF THE INVENTION

The present invention relates to MacPherson strut assemblies, and more particularly, to an improved apparatus and method of repairing certain MacPherson strut assemblies.

MacPherson strut assemblies are commonly used as a part of the suspension systems for modern automobiles and related vehicles. Typically, such assemblies are used for the vehicle front or steering suspension and to support the vehicle body, also known as the "sprung" mass, upon the vehicle chassis, also known as the "unsprung" mass. The advantages of using MacPherson strut assemblies in such applications are numerous and well known to persons having skill in this art.

The design of MacPherson strut assemblies varies from manufacturer to manufacturer. In certain MacPherson strut assemblies used in various models of automobiles sold during the late 1970's and early 1980's, the MacPherson strut assemblies included a piston rod whose upper end was attached, through a upper housing support assembly, to the vehicle body. In these strut assemblies, the support housing assembly included a first member which was attached to the vehicle body and a second member which was connected with the piston rod so that the piston rod acts against this second member. A rubber member was disposed between and was secured to the first and second members of the support housing assembly by a vulcanization process. An annular, inverted bell shaped retainer member was used to secure the support housing assembly to the upper end of the piston rod. More particularly, the piston rod extends through the central opening in the retainer member. The otherwise closed end of the retainer member extends through the central opening in the first member so that the side of the retainer member snugly abuts the first member. A nut, threaded onto the upper end of the piston rod holds the retainer member tightly against the first member.

The intended purpose of the inclusion of the rubber member in the support housing assembly was to minimize the transmission of noise and vibrations between first and second members and thus between the strut assembly and the vehicle body. While initially the aforementioned strut assemblies apparently performed satisfactorily, an increasing number of owners and operators of models with these strut assemblies began complaining about the noise and vibration they were experiencing during the normal operation of their vehicles. This noise and vibration problem made driving, and particularly steering, unpleasant. The problem seemed to begin to occur after about one year of normal usage of the vehicles, or more specifically, after the strut assemblies had experienced from 200,000 to 400,000 cycles of usage, as compared to a normal life expectancy of well over one million cycles.

It was fairly easy for mechanics to identify the strut assembly as the cause of this objectionable noise and vibration problem. The difficulty was how to repair or correct the problem. This increasingly became a significant, widespread problem as the models having these strut assemblies aged.

Typically, an initial response by a mechanic to such a complaint was to tighten the nut that was threaded on the upper end of the piston rod and that served to hold the retainer member against the first member of the support housing assembly. Such tightening does not remedy the problem for long if at all. Ordinarily the next repair attempt involved the replacement of the "cartridge", that is, the strut cylinder, pressure cylinder and piston rod. The cost of this repair work was generally around $90.00 to $150.00 per model. Such replacement also does not solve the problem.

The next attempted repair involved the replacement of the upper support housing assembly. The cost of this was generally in the range of $90.00 to $100.00 per model and did temporarily remedy the problem. Nevertheless, the problem often reoccurred after the strut assemblies had been used for another 200,000 to 400,000 cycles, again well short of their anticipated normal life expectancies.

Generally one of the results of the unsuccessful attempted repairs and the temporary repair is that the car owner becomes quite frustrated and angry. The goodwill of the automobile manufacturer, as well as that of the manufacturer of the replacement parts, suffers even where the replacement of the support housing assembly "fixes" the problem.

SUMMARY OF THE INVENTION

In principal aspect, the present invention provides an inexpensive yet completely effective solution to the aforementioned noise and vibration problem. After analysis of this long-standing problem, it appears that the problem is caused by the improper curing of the rubber member disposed between the first and second members of the support housing assembly. As a result, the rubber member tends to cold flow and take a permanent set due to the continuing, repeated movement of the second member toward and away from the first member of the support housing assembly. Such cold flow results in a decrease in the axial dimension of the rubber member on the order of less than 100 thousandths of an inch. This slight change in the axial dimension causes the side of the retainer member to no longer tightly abut against the first member, and it is the resulting very small gap or spacing which causes the noise and vibrations that so many automobile owners and operators find objectionable.

The present invention provides a facile and practical solution to this long standing problem. Such a solution is obtained by placing an annular resilient member around the distal end of the piston rod and clamping it between the already existing shoulder on the piston rod and the second member of the support housing. The resilient member must be resilient enough to absorb the noise and vibrations caused by the strut assembly but also needs to be hard enough not to cold flow and take a permanent set under the forces typically imposed by the piston rod and coil spring on the support housing assembly. The cost of manufacturing such a resilient member is relatively inexpensive, literally just pennies, as compared to the repair costs for replacing a support housing assembly. The use of the resilient member, as described herein, has been found to extend the life of the support housing assembly to well over a million cycles, its normal life expectancy. With the resilient member in use, the typically expected performance and other benefits of the MacPherson strut assembly are again achieved.

Accordingly, it is a primary object of the present invention to provide an improved apparatus and method for inexpensively and effectively overcoming the long-standing noise and vibration problem experienced with certain MacPherson strut assemblies.

Another object of the present invention is to provide an improved apparatus and method for solving the aforementioned problem where the MacPherson strut assembly has a support housing assembly that is mounted on the distal end of the piston rod of the strut assembly and that comprises a first member adapted to be attached to the vehicle body, a second member spaced from the first member, and a rubber member disposed between and secured to the first and second members; where the distal end of the piston rod extends through central openings in the first, second, and rubber members; where a shoulder is formed on the distal end of the piston rod and is disposed adjacent to the second member where an annular bearing and spacer are mounted on the piston rod and are disposed adjacent to the shoulder; where the otherwise closed end of an inverted bell shaped retainer member extends through the central opening in the first member so that the side of the retainer member engages the first member; where a nut, threaded onto the upper end of the piston rod, holds the retainer member against the first member; and where an annular resilient member is also disposed on the piston rod and is clamped between the bearing and the second member of the support housing assembly, with the resilient member having a thickness, in an axial direction parallel to the longitudinal axis of the piston rod, and a hardness such that the resilient member will minimize the transmission of noise and vibration between the piston rod and the vehicle body without being subject to cold flowing and the taking of a permanent set during normal usage of the MacPherson strut assembly.

Still another object of the present invention is to provide an improved apparatus and method to solve the aforementioned noise and vibration problem where the resilient member is made of polyurethane material having a thickness of approximately 80 thousandths of an inch, having a hardness of approximately 80A durometer reading, and having outer and inner diameters substantially equal to the outer and inner diameters, respectively, of the bearing; and where the spacer extends through the central opening of the resilient member.

These and other objects, benefits and advantages of the present invention will be apparent to those having skill in this art from the following description of the preferred embodiment of the present invention and the drawings which illustrate that preferred embodiment.

DESCRIPTION OF THE DRAWINGS

FIG. 1 is a front perspective view of a model of a MacPherson strut assembly that is experiencing the aforementioned noise and vibration problem;

FIG. 2 is a partial vertical cross-sectional view showing the support housing assembly and the distal end of the piston rod when the strut assembly is experiencing the aforementioned noise and vibration problem;

FIG. 3 is a partial vertical cross-sectional view similar to the view in FIG. 2 with the annular resilient member of the present invention being disposed about the piston rod;

FIG. 4 is a partial, exploded cross-sectional view of the support housing assembly and the upper end of the piston rod as shown in FIG. 3;

FIG. 5 is a perspective view of the annular resilient member; and

FIG. 6 is an enlarged partial vertical cross-sectional view similar to the view in FIG. 3.

DESCRIPTION OF THE PREFERRED EMBODIMENT

Referring now to FIGURES and 2, a MacPherson strut assembly of the type that has been used in various models of automobiles sold during the late 1970's and early 1980's is generally indicated at 12. This assembly includes a strut cylinder 14. A pressure cylinder, not shown, is disposed within the cylinder 14 and has a reciprocating piston, also not shown, disposed within it. The strut cylinder, pressure cylinder, and piston are all of conventional design and structure. A bracket 16 is used to attach the lower end of the strut cylinder 14 to a vehicle chassis in a conventional manner.

A piston rod 18 is connected, at its one end, with the piston in the pressure cylinder. The other or upper end 22 of the piston rod 18 extends out of the pressure cylinder and out of the upper end of the strut cylinder 14 in a conventional manner. An upper support housing assembly 24 is connected with the upper end 22 of the piston rod 18 as hereinafter, more specifically described.

A coil spring 26 is disposed about and is radially spaced from the upper end 22 of the piston rod 18 and at least part of the strut cylinder 14, as best illustrated in FIG. 1. The lower end of the coil spring 26 abuts a flange 28 mounted on the strut cylinder 14. The upper end of the coil spring 26 abuts a conventional upper seat member, not shown, that is carried by the upper end 22 of the piston rod 18 in a conventional manner. The coil spring 26 biases the strut cylinder 14 and the support housing assembly 24 apart in an axial direction, that is, in a direction substantially parallel to the longitudinal axis of the piston rod 18

As best seen in FIG. 2, the support housing assembly 24 includes an annular, first, generally hat-shaped member 32. This member, which is made from steel, has a central opening 34 formed therein. Three upstanding studs 36 are secured to the member 32 at equally spaced points about its periphery. These studs 36 are used to attach the member 32, and thus the support housing assembly 24, to a vehicle body in a conventional manner.

The support housing assembly 24 also includes an annular second member 38. It is also made from steel and is spaced from the first member 32 in an axial direction. Like the first member 32, the second member 38 has a central opening 42 formed therein. The second opening 42, however, is smaller in diameter than the opening 34 although the two openings are coaxial.

An annular rubber member 44 is disposed between the members 32 and 38 and is tightly secured to these members by a conventional vulcanization process. The member 44 is designed to hold the members 32 and 38 apart a preselected axial distance and to minimize the transmission of noise and vibration between the first and second members during normal operation of the strut assembly 12. A relatively large diameter central opening 46 is formed in the member 44. This opening 46 is coaxial with the openings 34 and 42.

As best illustrated in FIGS. 2–4 and 6, conventional threads 48 are formed on an upper portion of the end 22 of the piston rod 18. A shoulder 52 is also formed on the piston rod 18 and is located a short distance below the threads 48. The end 22 of the piston rod 18 projects or extends through the central openings 34, 46 and 42 of the member 32, 44 and 38, respectively, when the support housing assembly 24 is mounted on the end of the piston rod 18.

The shoulder 52 is disposed below the member 38 so as to provide a space therebetween to accommodate a conventional annular, thrust ball bearing 54 and a cylindrical spacer 56 as best shown in FIGS. 2, 3 and 6. The bearing 54 has an inner diameter that permits the bearing to be supported on the shoulder 52 when the bearing is disposed about the portion of the piston rod 18 between the shoulder 52 and the threads 48. The outer diameter of the bearing extends beyond the shoulder 52. As best shown in FIG. 6, the wall of the second member 38 is formed, adjacent to the central opening 42, to define a generally cup-shaped portion 58 that closely receives the bearing 54. In other words, this cup-shaped portion 58 is dimensioned so that the bearing will fit snugly within it.

The cylindrical space 56 also closely fits about the portion of the piston rod 18 between the threads 48 and the shoulder 52. Its lower end abuts the radially inner portion of the lower wall 62 of the bearing 54. The upper end of the spacer projects through the opening 42 in the member 38 and extends slightly above the upper wall portion of the member 38 that is adjacent to and defines the opening 42.

An annular, inverted bell-shaped retainer member 64 is used to secure the upper support housing assembly 24 on the upper end 22 of the piston rod 18. The retainer member 64 includes a central opening 66 having a diameter that is smaller than the diameters of the openings 42 or 34 of the members 38 and 32, respectively, and that is slightly larger than the diameter of the adjacent portion of the piston rod 18.

When the strut assembly 12 is properly mounted on a vehicle, the upper end 22 of the piston rod 18 extends through the openings 42 in the second member 38, the opening 66 in the retainer member 64, opening 46 in the rubber member 44, and the opening 34 in the first member 32. A nut 68 is then threaded onto the threads 48. When tightened, this nut holds the retainer member 64 within the opening 34 so that its normally otherwise closed end 72 contacts the upper end of the spacer 56. The side wall of the retainer 64 then tightly abuts the peripheral wall portion of the first member 32 that is adjacent to and defines the opening 34. When thus assembled, the rubber member 44 serves to minimize the transmission of noise and vibration between the piston rod 18 and the spring 26, on the one hand, and the first member 32, and hence the vehicle body, on the other hand. The bearing 54 permits relative rotational movement to occur between the piston rod 18 and the support housing assembly 24.

When the support housing assembly 24 is secured to the piston rod 18 as described above, it has been found to initially work satisfactorily in that the rubber member 44 initially minimizes the transmission of noise and vibration from the piston rod 18 and the spring 26 to the vehicle body. However after about a year's use (that is, after the strut assembly 12 has been subjected to between 200,000 and 400,000 cycles of operation), a persistent, annoying rattle or similar noise, as well as objectionable vibrations, are often experienced by the driver of the vehicle when he operates the vehicle in a normal manner. An analysis of this objectionable noise and vibration problem indicates that it is due to the existence of a small gap or spacing between the side wall of the retainer member 64 and the peripheral wall portion of the first member 32 that is adjacent to and defines the opening 34. This gap is created, even though the nut 68 remains tight, because the rubber member 44 has cold flowed and taken a permanent set as a result of the normal operation of the strut assembly 12 that repeatedly compresses the rubber member 44 between the members 32 and 38. This cold flowing of the rubber member 44 results in a change in the axial dimension between the first and second members 32 and 38. This resulting gap is very small and hard to detect since the change in dimension of the rubber member (that is, in a direction parallel to the longitudinal axis of the piston rod 18) is less than 100 thousandths of an inch although it is shown much larger in FIG. 2 for the purpose of illustration.

It has been found that this objectionable noise and vibration problem can be effectively and efficiently overcome by placing an annular resilient member 74 about the upper end 22 of the piston rod 18 and between the upper wall of the bearing 54 and the adjacent portion of the second member 38. This resilient member 74, best shown in FIGS. 3 and 6, has a central opening 76 that is coaxial with the longitudinal axis of the piston rod 18. The inner diameter of the member 74 is substantially equal to the outer diameter of the spacer 56 which extends through the resilient member. The outer diameter of the member 74 is substantially equal to the outer diameter of the bearing 54, and thus the resilient member 74 may be also snugly disposed within the cup-shaped portion 58.

The thickness or height of the resilient member 74, in an axial direction (that is, in a direction parallel to the longitudinal axis of the piston rod 22) should be sufficient so that the retainer member 64 is again brought into close, snug, metal-to-metal contact with the peripheral wall portion of the first member 32, that is, the wall portion adjacent to and defining the opening 34. The inclusion of the resilient member 74 also causes the otherwise closed end 72 of the retainer member 64 to abut the member 38 adjacent to its central opening 42 and the upper end of spacer 56.

The use of a resilient member 74 having a thickness of between approximately 40 ; thousandths and approximately 100 thousandths of an inch will satisfactorily solve the aforementioned noise and vibration problem. In this regard, it should be noted, however, if the member has a thickness of close to 40 thousandths or close to 100 thousandths of an inch, the objectionable noise and vibration problem may not be solved for the entire life expectancy of the support housing assembly 24. When the member 74 has a thickness of approximately 100 thousandths of an inch or greater, the axial pre-load applied to the bearing 54 by the compression of the member 74 will increase substantially. This may shorten the life of the bearing and may degrade the steering performance of the vehicle. The preferred thickness of the member 74 is approximately 80 thousandths of an inch.

It has also been found that the resilience or hardness of the member 74 is also important to the effective solution of the noise and vibration problem. The resilience of this member must be such that the member will minimize the transmission of noise and vibration between the piston rod and coil spring, on the one hand, and the vehicle body, on the other hand, without being subject to cold flowing and the taking of a permanent set during normal usage of the strut assembly 12. If the resilient member is too hard, as when, for example, it is made of steel, the resilient member will not perform its intended function of minimizing the transmission of noise and vibration, although of course, it will not cold flow or take a permanent set. Tests to date indicate that a resilient member 74 will work satisfactorily when it is made from a polyurethane material having an approximate 80A durometer reading. An example of such a polyurethane material is that sold by the McMaster Carr Supply Company of Chicago, Ill., part number 8717K53.

While only one embodiment of the present invention has been described hereinabove, those skilled in the art will appreciate that others may be possible without departing from the scope of the appended claims.

I claim:

1. In a MacPherson strut assembly for use in a vehicle suspension system supporting a vehicle body upon a vehicle chassis wherein the strut assembly comprises: a strut cylinder that has one end attached to the vehicle chassis; a piston rod that extends from the other end of the strut cylinder, the piston rod having a shoulder formed adjacent to its other end, and also having a coaxial annular spacer member and an annular bearing mounted on its other end rod and abutting the shoulder, with the outer diameter of the spacer being less than the inner diameter of the bearing, with the axial length of the spacer being greater than the axial length of the bearing, and with the outer diameter of the bearing being greater than the diameter of the piston rod; an upper support housing assembly comprising: a first member having a central opening therein through which the other end of the piston rod extends and that includes means for attaching the support housing assembly to the vehicle body; a second member that is spaced from the first member a preselected distance in an axial direction parallel to the longitudinal axis of the piston rod and that also has a central opening therein which is aligned with the central opening in the first member and through which the other end of the piston rod extends; and an annular rubber member that is disposed between the first and second members and is secured to each of the first and second members, with the rubber member having a central opening therein which is aligned with the central openings in the first and second members and through which the other end of the piston rod extends; an annular inverted bell shaped retained member having a central opening in its otherwise closed end through which the other end of the piston rod extends and also having its otherwise closed end extending through the central opening of the first member; a nut threaded onto the other end of the piston rod so as to secure the support housing assembly on the other end of the piston rod by clamping the side of the retainer member against the first member, adjacent to the central opening of the first member; and a coil spring disposed about and radially spaced from the piston rod and at least part of the strut cylinder and biasing the support housing and the strut cylinder axially apart, the rubber member being intended to minimize the transmission of noise and vibrations between the first and second members of the support housing assembly, but cold flowing and taking a permanent set after normal usage of the MacPherson strut assembly so that objectionable noise and vibration are transmitted from the piston rod and the coil spring through the first and second members and hence to the vehicle body, the improvement comprising:

an annular resilient member that has a central opening and that is disposed about the other end of the piston rod and between the bearing and the second member, with the resilient member having a thickness, in an axial direction parallel to the longitudinal axis of the piston rod, and a resilience such that the resilient member will minimize the transmission of noise and vibration between the piston rod and the vehicle body during normal usage of the MacPherson strut assembly.

2. The improvement described in claim 1 wherein the resilient member is made of polyurethane material having a thickness of between approximately 40 thousandths and approximately 100 thousandths of an inch; and wherein the spacer extends axially through the central opening of the resilient member.

3. The improvement described in claim 1 wherein the resilient member is mad of polyurethane material having resistance to cold flowing and taking a permanent set, having a thickness of approximately 80 thousandths of an inch, having a hardness of approximately 80A durometer reading, and having outer diameters substantially equal to the outer and inner diameters respectively, of the bearing; and wherein the spacer extends through the central opening of the resilient member.

4. An annular resilient member for repairing a MacPherson strut assembly used in a vehicle suspension system to support a vehicle body upon a vehicle chassis wherein the strut assembly comprises: a strut cylinder that has one end attached to the vehicle chassis; a piston rod that extends from the other end of the strut cylinder, the piston rod having a shoulder formed adjacent to its other end, and also having an annular bearing and a coaxial annular spacer member mounted on its other end and abutting the shoulder, with the outer diameter of the spacer being less than the inner diameter of the bearing, with the axial length of the spacer being greater than the axial length of the bearing, and with the outer diameter of the bearing being greater than the diameter of the piston rod; an upper support housing assembly wherein the support housing assembly comprises: a first member that has a central opening therein through which the other end of the piston rod extends and that includes means for attaching the support housing assembly to the vehicle body; a second member that is spaced from the first member a preselected distance in an axial direction parallel to the longitudinal axis of the piston rod and that also has a central opening therein which is aligned with the central opening in the first member and through which the other end of the piston rod extends; an annular rubber member that is disposed between the first and second members and is secured to each of the first and second members, with the rubber member having a central opening therein which is aligned with the central openings in the first and second members and through which the other end of the piston rod extends; an annular inverted bell shaped retainer member having a central opening in its otherwise closed end through which the other end of the piston rod extends and also having its otherwise closed end extending through the central opening of the first member; a nut threaded onto the other end of the piston rod so as to secure the support housing assembly on the other end of the piston rod by clamping the side of the retainer member against the first member, adjacent to the central opening of the first member; and coil spring disposed about and radially spaced from the piston rod and at least part of the strut cylinder and biasing the support housing and the strut cylinder axially apart, with the rubber member being intended to minimize the transmission of noise and vibration between the first and second members of the support housing assembly, but cold flowing and taking a permanent set after normal usage of the MacPherson strut assembly so that objectionable noise and vibration are transmitted from the piston rod and the coil spring, through the first and second members, and hence to the vehicle body, and with the resilient member having a central opening and being disposed about the other end of the piston rod and between the bearing and the second member, with the resilient member having a thickness, in an axial direction parallel to the longitudinal axis of the piston rod and a resilience such that the resilient member will minimize the transmission of noise and vibration between the piston rod and the vehicle body during normal usage of the MacPherson strut assembly.

5. The resilient member described in claim 4 wherein the resilient member is made of polyurethane material having a thickness of between approximately 40 thousandths and approximately 100 thousandths of an inch; and wherein the spacer extends axially through the central opening of the resilient member.

6. The resilient member described in claim 4 wherein the resilient member is made of polyurethane material having resistance to cold flowing and taking a permanent set, having a thickness of approximately 80 thousandths of an inch having a hardness approximately 80 A durometer reading, and having outer and inner diameters substantially equal too the outer and inner diameters, respectively, of the bearing; and wherein the spacer extends axially through the central opening of the resilient member.

7. An improved method of repairing a MacPhersion strut assembly used in a vehicle suspension system to support a vehicle body upon a vehicle chassis wherein the strut assembly comprises: a strut cylinder that has one end attached to the vehicle chassis; a piston rod that extends from the other end of the strut cylinder the piston rod having a shoulder formed adjacent to its other end, and also having an annular bearing and a coaxial annular spacer member being mounted on its other end and abutting the shoulder, with the outer diameter of the spacer being less than the inner diameter of the bearing, with the axial length of the spacer being greater than the axial length of the bearing and with the outer diameter of the bearing, being greater than the diameter of the piston rod; an upper support housing assembly wherein the support housing assembly comprises: a first member that has a central opening therein through which the other end of the piston rod extends and that includes means for attaching the support housing assembly to the vehicle body; a second member that is spaced from the first member a preselected distance in an axial direction parallel to the longitudinal axis of the piston rod and that also has a central opening therein which is aligned with the central opening in the first member and through which the other end of the piston rod extends; and an annular rubber member that is disposed between the first and second members and is secured to each of the first and second members, with the rubber member having a central opening therein which is aligned with the central openings in the first and second members and through which the other end of the piston rod extends; an inverted annular bell-shaped retainer member having a central opening in its otherwise closed end through which the other end of the piston rod extends and also having its otherwise closed end extending through the central opening of the first member; a nut threaded onto the other end of the piston rod so as to secure the support housing assembly on the other end of the piston rod by clamping the side of the retainer member against the first member, adjacent to the central opening of the first member; a coil spring disposed about and radially spaced from the piston rod and at least part of the strut cylinder and biasing the support housing assembly and the strut cylinder apart; with the support member being intended to minimize the transmission of noise and vibration between the first and second members of the support housing assembly, but cold flowing and taking a permanent set after normal usage of the MacPherson strut assembly so that objectionable noise and vibration are transmitted from the piston rod and the coil spring, through the first and second members, and hence to the vehicle body, the improved method comprising the steps of:

disassembling the support housing assembly from the outer end of the piston rod by removing the nut, the first member, the second member and the rubber member from the other end of the piston rod; inserting an annular resilient member, having a central opening therein, over the other end of the piston rod and positioning the resilient member adjacent to and between the bearing and the second member so that the spacer projects through the central opening of the resilient member, with the resilient member having a thickness, in an axial direction parallel to the longitudinal axis of the piston rod and a resilience such that the resilient member will minimize the transmission of noise and vibration between the piston rod and the vehicle body during normal usage of the MacPherson strut assembly; reassembling the support housing assembly on the other end of the piston rod; and securing, through the use of the nut, the support housing assembly on the other end of the piston rod so that the resilient member is clamped between the second member and the bearing.

8. The improved method described in claim 7 wherein the resilient member is made of polyurethane material having a thickness of between approximately 40 thousandths and approximately 100 thousandths of an inch.

9. The improved method described in claim 7 wherein the resilient member is made of polyurethane material having resistance to cold flowing and taking a permanent set, having a thickness of approximately 80 thousandths of an inch, having an approximately 80A durometer hardness reading, and having its outer diameters substantially equal to the outer and inner diameters, respectively, of the bearing.

* * * * *